UNITED STATES PATENT OFFICE.

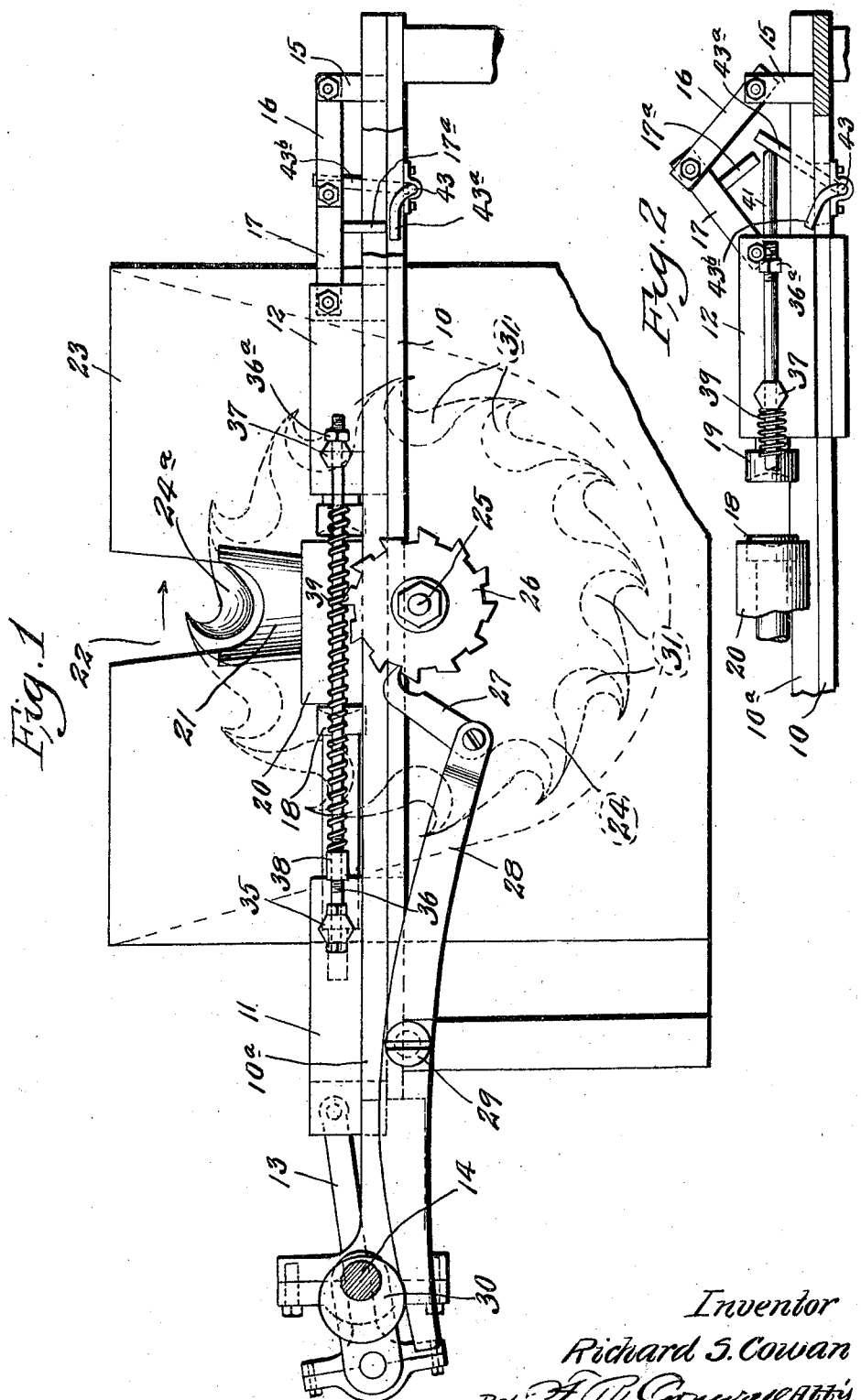

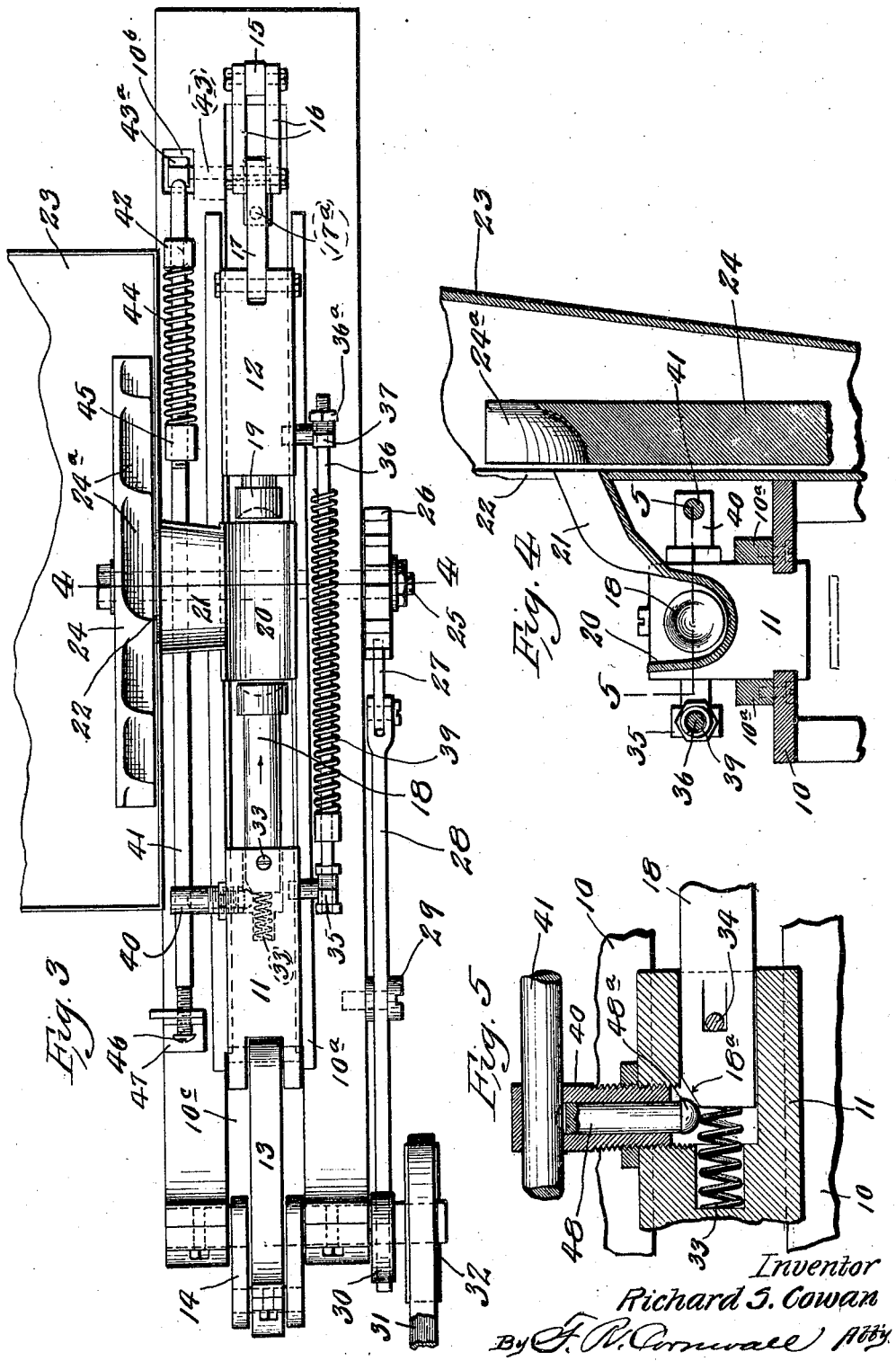

RICHARD S. COWAN, OF ST. LOUIS, MISSOURI, ASSIGNOR OF ONE-HALF TO GEORGE TOWER, JR., OF ST. LOUIS, MISSOURI.

NUT-CRACKING MACHINE.

1,401,588.

Specification of Letters Patent. Patented Dec. 27, 1921.

Application filed March 21, 1921. Serial No. 453,979.

*To all whom it may concern:*

Be it known that I, RICHARD S. COWAN, a citizen of the United States, residing at St. Louis, Missouri, have invented a certain new and useful Improvement in Nut-Cracking Machines, of which the following is a full, clear, and exact description, such as will enable others skilled in the art to which it appertains to make and use the same, reference being had to the accompanying drawings, forming part of this specification.

This invention relates to nut cracking machines, and the object of the invention is to provide a machine which will efficiently crack the shells of nuts without crushing the kernels thereof, and to provide a machine of the class described which is of strong and durable construction and simple in operation.

Another object of the invention is to provide a nut cracking machine having a compensating mechanism which automatically adjusts itself to the various sizes of the nuts and which releases one of the cracking jaws immediately after the shell of the nut is cracked, thereby preventing the crushing or mashing of the kernel.

Still another object is to provide improved mechanism for delivering the nuts singly from the hopper between the cracking jaws.

With these and other objects in view, my invention consists in certain novel features of construction and arrangement of parts, hereinafter more fully described and claimed, and illustrated in the accompanying drawings, in which—

Figure 1 is a side elevation of my improved nut cracking machine and showing the cracking jaws at the beginning of the cracking operation.

Fig. 2 is a fragmentary side elevation showing the cracking jaws at the completion of the cracking operation.

Fig. 3 is a top plan view of the machine.

Fig. 4 is a vertical cross section on the line 4—4 of Fig. 3.

Fig. 5 is a horizontal cross section on line 5—5 of Fig. 4.

Referring by reference numerals to the accompanying drawings, 10 designates a table on which are slidably mounted blocks 11 and 12 between suitable guideways 10ª. Block 11 is connected at its outer end by a connecting link 13 to a crank shaft 14 journaled in the rear end of said table. The forward end of table 10 is provided with a stationary post 15 to the upper end of which is pivotally connected the outer end of a link 16, the opposite end of which has pivotal connection with one end of link 17 which has its other end pivotally mounted in the outer end of block 12. Links 16 and 17 constitute a toggle connection between block 12 and stationary support 15. This toggle connection is adapted to hold block 12 stationary during the cracking operation and permits the retractive or outward movement of said block when said toggle connection is broken and which disabling of the toggle connection takes place immediately after the cracking operation.

The inner end of block 11 is provided with a cracking jaw 18 which faces a cracking jaw 19 fixed to block 12. An open-ended receiving trough 20 having a semi-circular bottom is longitudinally disposed on the table and is traversed by cracking jaw 18 while the cracking jaw 19, when in extended position, is located adjacent to the opposite end of said trough. Communicating with trough 20 is the lower end of a downwardly inclined chute 21 and its upper end rests in the discharge opening 22 formed in one of the side walls of hopper 23. Operating in the hopper is a feed wheel 24 which is fixed to one end of a transverse shaft 25, the latter being journaled in suitable bearings carried by the under side of table 10. The outer end of shaft 25 is provided with a ratchet wheel 26 which is adapted to be intermittently operated by a pawl 27 pivotally carried by one end of a lever 28 which is fulcrumed to table 10 at 29 and has its outer end bearing against the cam or eccentric 30 fixed to one end of crank shaft 14.

Shaft 14 is driven in any suitable manner and preferably by a belt 31 and pulley 32. The periphery of wheel 24 is provided with pockets 24ª, the bottom or inner walls of which are inclined toward the discharging side of hopper 23 so that when wheel 24 is rotated in the direction indicated by the arrow, the nuts contained in the hopper will enter said pockets and will be carried singly by each pocket upwardly. When each pocket comes in alinement with the discharge opening 22, the nut contained therein will drop from the pocket through the opening 22 into the chute 21 and then into the receiving trough 20.

Cracking jaw 18 is slidably mounted in block 11 and an expansion spring 33 seated in a recess in said pocket bears against that end of cracking jaw 18 which is mounted in block 11. Spring 33 tends to hold jaw 18 in its outward position and a screw 34 seated in block 11 engages a groove or shoulder on the upper face of said jaw and prevents the displacement of jaw 18 from its position in block 11.

Projecting outwardly from one side of block 11 is a lateral lug 35 in which is adjustably fixed one end of a longitudinally disposed rod 36. The opposite end of this rod has a sliding bearing in a lateral lug 37 projecting outwardly from block 12 and is provided with an adjustable head 36$^a$. A sleeve 38 is adjustably carried by rod 36 and positioned on said rod between sleeve 38 and lug 37 is a coil spring 39. When block 11 and jaw 18 are moved inwardly toward the jaw 19 by the rotation of crank shaft 14, rod 36 fixed to lug 35 slides through lug or bearing 37 and spring 39 is compressed between sleeve 38 which is carried by sliding rod 36 and lug 37 carried by block 12.

When the toggle connection 16 and 17 between block 12 and stationary post 15 is broken, the energy stored in the compressed spring 39 forces block 12 and jaw 19 outwardly and away from jaw 18. Upon the return or rearward movement of block 11 and jaw 18, adjustable head 36$^a$ will engage lug 37 on block 12 and return block 12 and jaw 19 to their normal or cracking position and at the same time restore the toggle connection 16 and 17.

A lateral lug 40 projects outwardly from the inner or hopper side of block 11. Operating through said lug and having a bearing therein is a tripping rod 41 which is arranged parallel with jaws 18 and 19. The front or tripping end of this rod has a sliding bearing in a post 42 projecting upwardly from table 10. A tripping member 43 is pivotally supported on table 10 and is provided at one end with an upwardly projecting arm 43$^a$ which operates through a slot 10$^b$ in table 10 and is arranged in the path of movement of the forward end of rod 41. A horizontally disposed arm 43$^b$ is fixed at the other end of pivotal member 43 and operates through longitudinal slot 10$^c$ in table 10. This horizontal arm 43$^b$ lies immediately below the lower end of pin or projection 17$^a$ depending downwardly from link 17.

Rod 41 is normally held retracted and out of operative engagement with arm 43$^a$ by means of an expansive spring 44 positioned on said rod and having one end resting against post 42 and its opposite end bearing against sleeve 45 adjustably carried on rod 41. The rearward movement of rod 41 is controlled by a screw 46 adjustably seated in bracket 47 projecting upwardly from table 10. Slidably mounted in lug 40 is a pin 48, the outer end of which is adapted to frictionally engage rod 41. The inner end 48$^a$ projects inwardly into block 11 and lies in the path of movement of a cam portion 18$^a$ arranged on the rear end of jaw 18.

In the operation of my improved machine and assuming the parts to be in the position shown in Fig. 3, the forward movement of the reciprocatory jaw 18 will grip a nut deposited in the receiving trough 20 between jaws 18 and 19. The continued forward movement of block 11 causes the end 48$^a$ of pin 48 to ride upon the cam portion 18$^a$ of jaw 18 which jaw has been retarded in its forward movement by the nut positioned between jaws 18 and 19. Cam portion 18$^a$ forces pin 48 outwardly against rod 41, thereby gripping said rod and causing it to move forwardly with block 11. As soon as the cam portion 18$^a$ forces pin 48 against rod 41, the retrograde movement of jaw 18 is stopped and the shell of the nut is cracked between the reciprocatory jaw 18 and the stationary jaw 19. Just about the time the shell of the nut is cracked between the jaws or immediately thereafter, the forward end of rod 41 strikes the upwardly projecting arm 43$^a$, of rocking member 43, and causing horizontal arm 43$^b$ to strike pin 17$^a$ carried by link 17 and moving the pivotal connection between links 16 and 17 upwardly out of alinement with the pivotal connections of link 16 and stationary post 15, and link 17 and block 12, thereby destroying the toggle connection. As soon as the toggle connection is broken, energy stored in the compressed spring 39 causes block 12 and jaw 19 to move outwardly and away from jaw 18. Jaw 18 continues its forward movement for a short period of time, after jaw 19 is retracted and discharges the cracked nut from the trough 20 onto a suitable endless conveyer located below said receiving trough.

When jaw 19 is released by having its toggle support broken, the end thrust on jaw 18 is removed, permitting spring 33 to move jaw 18 outwardly, thereby relieving pressure on pin 48 and releasing rod 41 from engagement with block 11.

The spring 33 is of sufficient size to normally hold the reciprocating jaw 18 in its outer position so that the nut dropped into the receiving trough 20 will be firmly gripped between jaws 18 and 19 before spring 33 will yield and permit a slight forward movement of block 11 while the jaw 18 is stationary and compresses spring 33. This differential forward movement of block 11 with respect to jaw 18 carries pin 48 forward against the cam portion 18$^a$ on the inner end of jaw 18. The inner end 48$^a$ of pin 48 rides upon said cam portion and forces pin 48 against idle rod 41. Rod 41 is now engaged by pin 48 and is carried forwardly by block 11 to operate tripping member 43. As soon as pin 48 is forced against rod 41, the yielding movement of jaw 18 is stopped and said jaw is carried forwardly to first complete the cracking operation and then eject the cracked nut from the receiving trough 20. The position of rod 41 with respect to arm 43ᵃ may be adjusted by turning screw 46 which acts as a stop for rod 41.

The toggle mechanism comprising links 16 and 17 provides a support which is rigid during the cracking operations and receives the end thrust of jaw 19 and block 12 and which support can be quickly operated at the end of the cracking operation to prevent crushing of the nuts and permit the ejection thereof into a suitable receptable or on an endless conveyer. By mounting jaw 18 yieldingly in block 11 and utilizing this yielding movement to operate the tripping mechanism to release jaw 19, the device automatically adjusts itself to the nuts of various sizes and dimensions, as the jaw 18 will operate pin 48 only when resistance is offered to its forward movement by the interposition of a nut between jaws 12 and 18.

A nut cracking machine of my improved construction has a wide range of adjustments, is effective in performing its intended functions, and practically noiseless in its operations.

It will be readily understood that minor changes in the size, form and construction of the various parts of my improved nut cracking machine can be made and substituted for those herein shown and described, without departing from the spirit of my invention, the scope of which is set forth in the appended claims.

I claim:

1. In a nut cracking machine, a yielding reciprocating jaw, a releasable jaw adapted to coöperate with said reciprocating jaw, said reciprocating jaw having a yielding longitudinal movement independently of said releasable jaw, and means for releasing said releasable jaw, said means being adapted to become operative by the yielding movement of said reciprocating jaw.

2. In a nut cracking machine, a reciprocating member, a reciprocating jaw yieldingly mounted therein, a releasable jaw adapted to coöperate with the first mentioned jaw, and means for releasing said releasable jaw, said means being adapted to become operative by the yielding movement of said reciprocating jaw.

3. In a nut cracking machine, a reciprocating member, a reciprocating cracking jaw yieldingly mounted therein, a releasable cracking jaw adapted to coöperate with said reciprocating jaw, means for releasing said releasable jaw and adapted to become operative by the yielding movement of said reciprocating jaw, and means for moving said releasable jaw in a retracted position.

4. In a nut cracking machine, a reciprocating member, a reciprocating cracking jaw yieldingly mounted therein, a releasable cracking jaw adapted to coöperate with said reciprocating jaw, means for releasing said releasable jaw and adapted to become operative by the yielding movement of said reciprocating jaw, means for moving said releasable jaw in a retracted position, and means operable by said reciprocating member for restoring said releasable jaw to its normal or operative position.

5. In a nut cracking machine, a reciprocating block, a yielding cracking jaw mounted in said block, a releasable cracking jaw opposing said reciprocating jaw and having toggle connection with a stationary portion of said machine, and means controlled by said yielding jaw and adapted to operate said toggle connection to release the releasable jaw.

6. In a nut cracking machine, a reciprocating member, a reciprocating jaw mounted in said member and having differential movement with respect thereto, a releasable cracking jaw adapted to coöperate with said reciprocating jaw, a toggle mechanism for holding said releasable jaw stationary, tripping means for breaking said toggle, and means for operating said tripping means and adapted to be operatively connected to the reciprocating member by the differential movement between said reciprocating member and said reciprocating jaw.

7. In a nut cracking machine, a reciprocating member, a reciprocating jaw yieldingly mounted in said member, a movable jaw coöperating with said reciprocating jaw, toggle means for opposing the movement of said movable jaw, tripping means for breaking said toggle, and means operated by the yielding movement of the reciprocating jaw for operatively connecting said tripping means to the reciprocating member.

8. In a nut cracking machine, a reciprocating member, a reciprocating jaw yieldingly mounted in said member, a movable jaw opposing said reciprocating jaw, toggle means for holding said movable jaw stationary, tripping means for rendering inoperative said toggle means, interengaging means between said reciprocating member and said tripping means, said interengaging means being operable by the yielding movement of the cracking jaw, and means for restoring said toggle means to operative position.

9. In a nut cracking machine, a stationary nut receiving trough, a reciprocating member, a reciprocating jaw yieldingly mounted in said member and adapted to traverse said receiving trough, an anvil coöperating with said reciprocating jaw and normally located adjacent to one end of said trough, toggle means for normally holding said anvil stationary and adapted to move it to a retracted position, a rocking member for disabling said toggle means, and means for operating said rocking member and adapted to be operatively connected to said reciprocating member by the yielding movement of the reciprocating jaw.

10. In a nut cracking machine, a reciprocating member, a reciprocating jaw yieldingly mounted in said member, a movable jaw opposing said reciprocating jaw, toggle means adapted to maintain said movable jaw stationary during the cracking operation, means for disabling said toggle means, a spring for moving said movable jaw in a retracted position, and means carried by said reciprocating member and operable by the yielding movement of said reciprocating jaw for operatively locking said reciprocating member to said disabling means.

11. In a nut cracking machine, a stationary receiving trough, a reciprocating jaw traversing said trough, a releasable jaw co-operating with said reciprocating jaw, means adapted to be actuated by said reciprocating jaw for releasing said releasable jaw, a hopper having a discharge opening communicating with said receiving trough, and a feed wheel mounted for rotary movement in said hopper and having a plurality of pockets arranged on its periphery whereby the nuts in the hopper are carried upwardly in said pockets and discharge through the discharge opening into the receiving trough.

12. In a nut cracking machine, a stationary receiving trough, a reciprocating jaw traversing said trough, a releasable jaw co-operating with said reciprocating jaw, means adapted to be actuated by said reciprocating jaw for releasing said releasable jaw, a hopper having a discharge opening communicating with said receiving trough, and a feed wheel rotatively mounted in said hopper and provided with circumferentially disposed pockets having lateral openings which are adapted to coincide with the discharge opening in the hopper.

In testimony whereof I hereunto affix my signature this 11th day of March, 1921.

RICHARD S. COWAN.